United States Patent [19]
La

[11] Patent Number: 5,686,716
[45] Date of Patent: Nov. 11, 1997

[54] BAR CODE VOID AND SPOT DISCRIMINATION

[75] Inventor: Chay La, Rochester, N.Y.

[73] Assignee: PSC, Inc., Webster, N.Y.

[21] Appl. No.: 644,443

[22] Filed: May 13, 1996

[51] Int. Cl.⁶ .................................................. G06K 7/10
[52] U.S. Cl. ........................ 235/462; 235/463; 235/436
[58] Field of Search .................................. 235/463, 462, 235/472, 494, 436, 467, 454

[56] References Cited

U.S. PATENT DOCUMENTS

| | | | |
|---|---|---|---|
| 3,890,597 | 6/1975 | Hanchett | 340/146.3 |
| 4,652,731 | 3/1987 | Chautemps et al. | 235/462 |
| 4,728,784 | 3/1968 | Stewart | 235/462 |
| 5,272,322 | 12/1993 | Nishida et al. | 235/462 |
| 5,296,691 | 3/1994 | Waldron et al. | 235/462 |
| 5,326,961 | 7/1994 | Sibata | 235/462 X |
| 5,336,874 | 8/1994 | Hasegawa | 235/466 |
| 5,387,787 | 2/1995 | Waldron et al. | 235/463 |
| 5,404,004 | 4/1995 | Sato et al. | 235/436 X |
| 5,412,196 | 5/1995 | Surka | 235/436 X |
| 5,457,308 | 10/1995 | Spitz et al. | 235/462 |
| 5,510,604 | 4/1996 | England | 235/463 X |
| 5,514,353 | 5/1996 | Ackley | 235/462 |
| 5,528,022 | 6/1996 | Nakazawa | 235/436 |

*Primary Examiner*—Donald T. Hajec
*Assistant Examiner*—Thien Minh Le
*Attorney, Agent, or Firm*—Foley & Lardner

[57] ABSTRACT

A void and spot discrimination apparatus and method for successfully decoding bar code symbols having imperfections therein. A first and a second scan are performed, and a signal return is obtained, in which information is obtained related to a smallest size black bar and white space, as well as a largest size black bar and white space. The signal returns from the first and second scans is sent to a decoder, and third and fourth scans are performed. The signal returns from the third and fourth scans are altered based on the smallest/largest sizes obtained from the two previous scans, in order to eliminate potential ink spreads and print voids. The process is alternated in this manner until a successful bar code decoding is made.

22 Claims, 11 Drawing Sheets

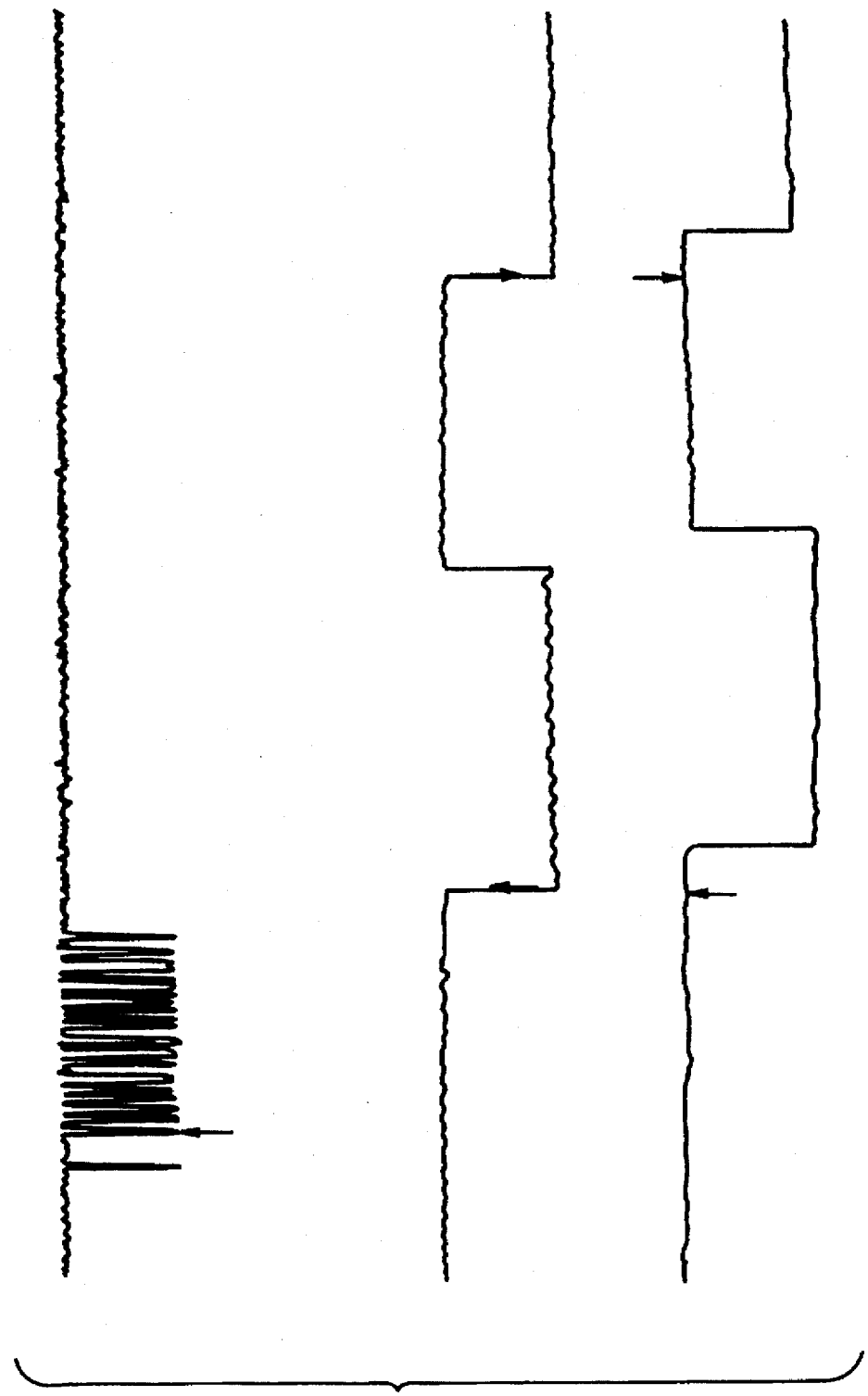

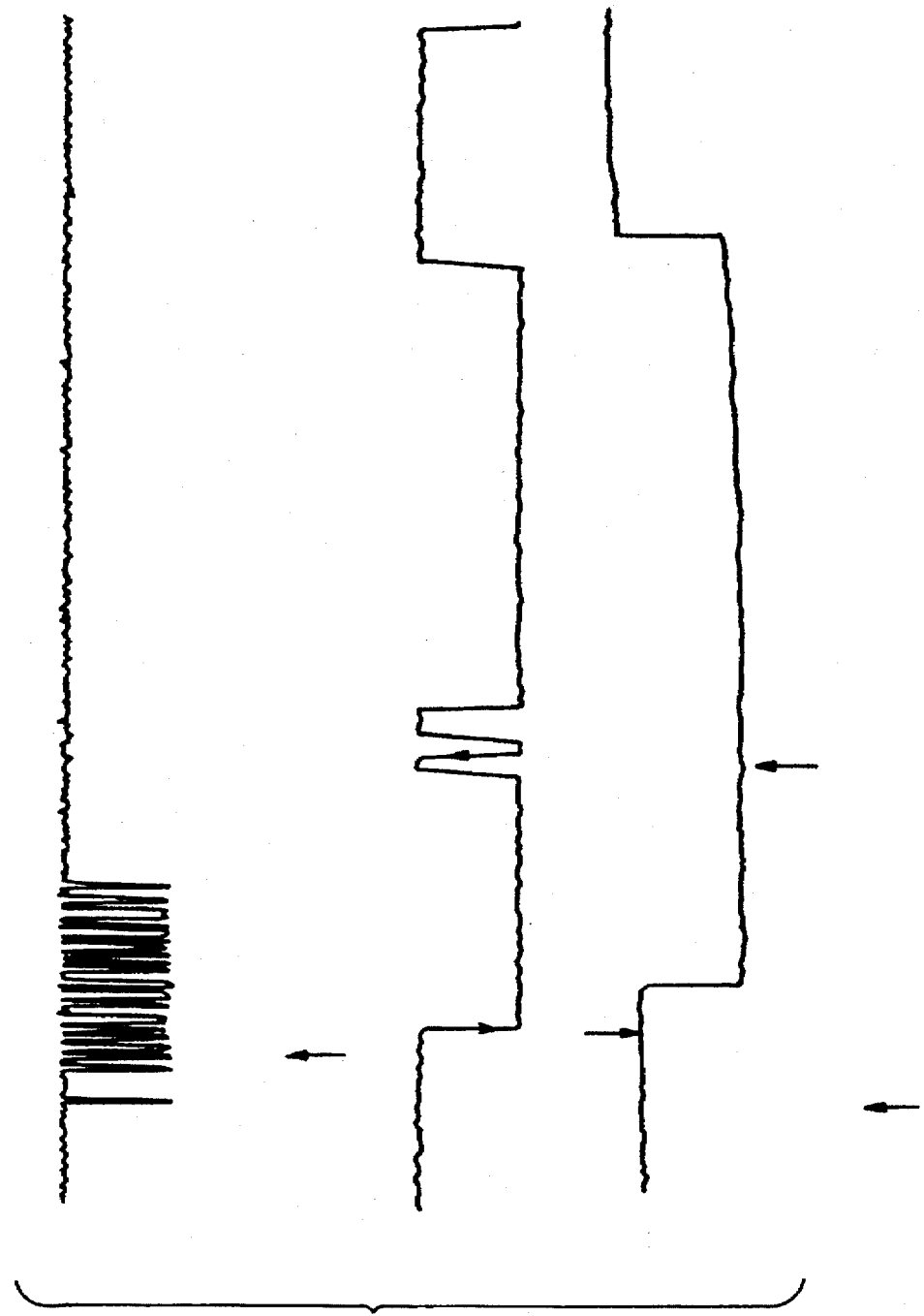

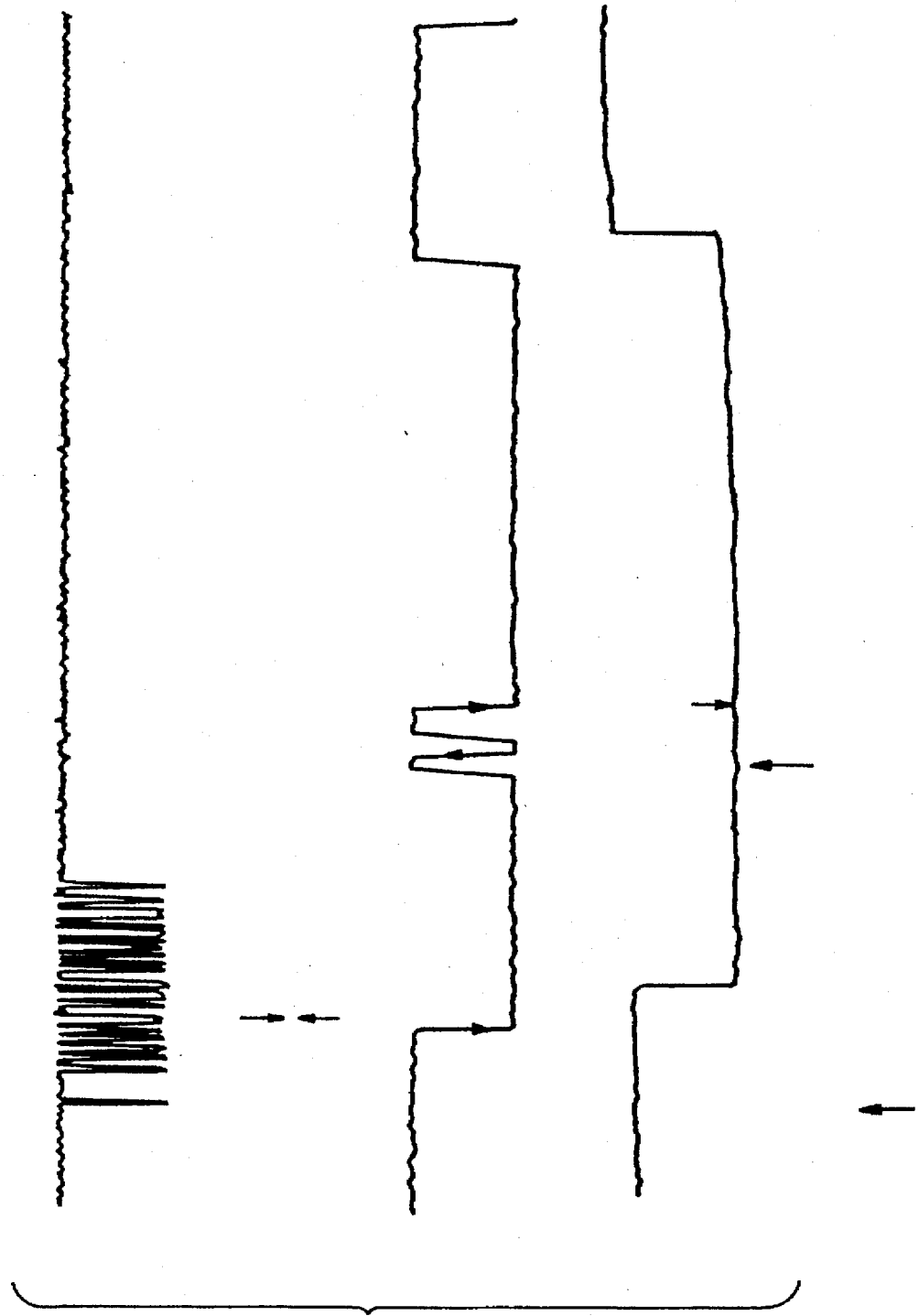

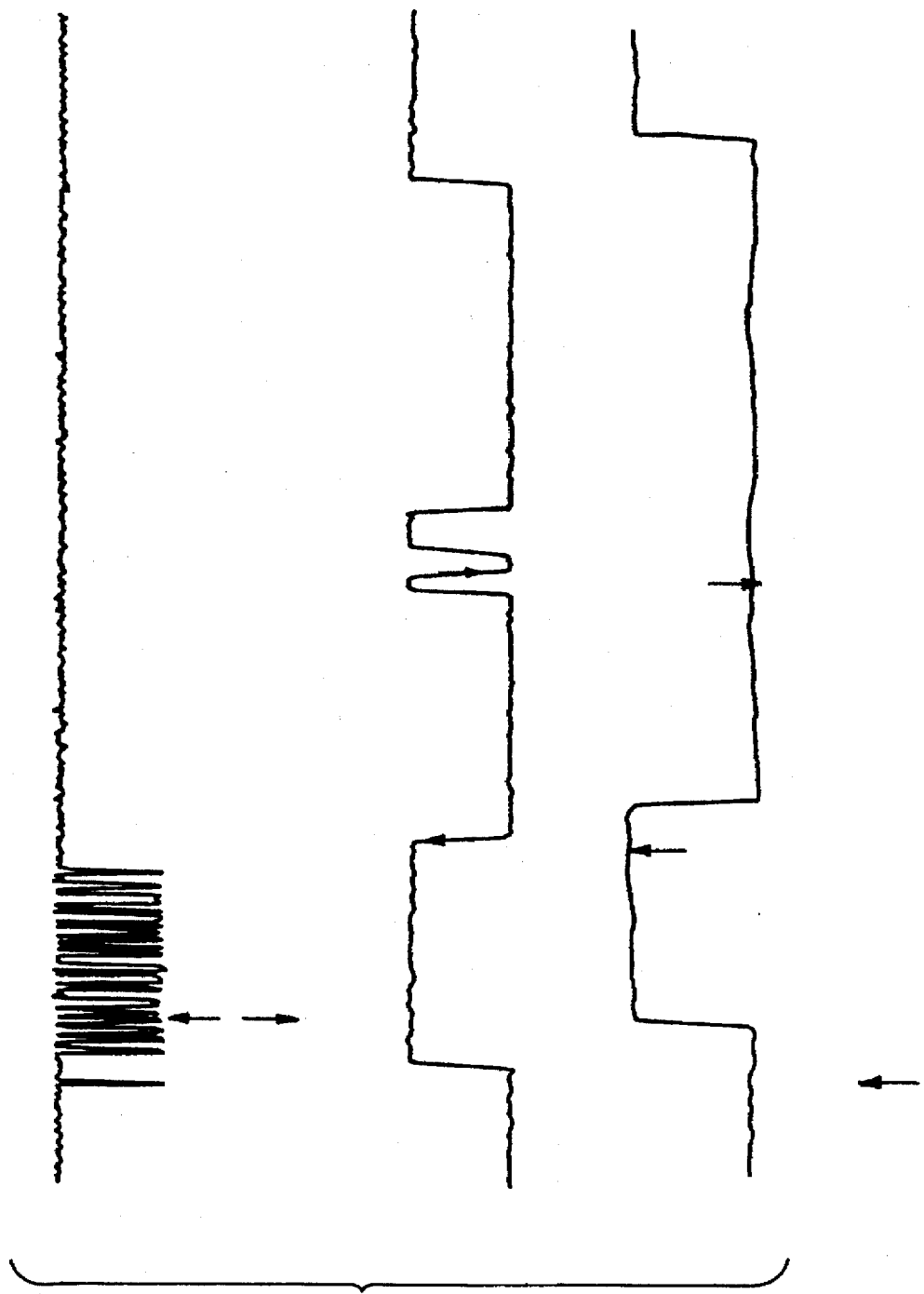

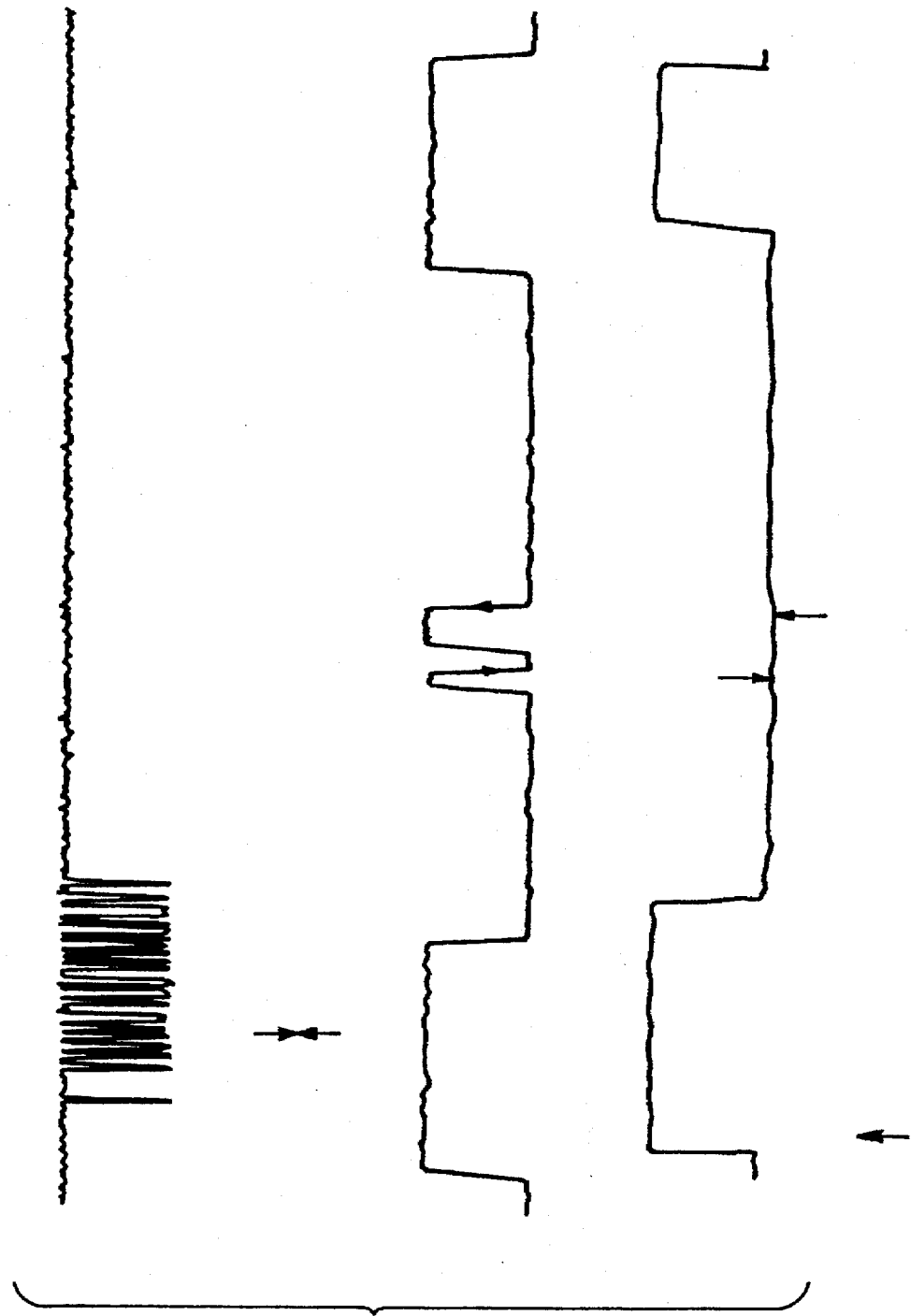

BAR CODE VOID AND SPOT DISCRIMINATION

BACKGROUND OF THE INVENTION

1. Field of the Invention

The invention relates to a void and spot discrimination method and apparatus. Specifically, the invention relates to a void and spot discrimination method and apparatus for successfully scanning imperfect bar codes by a bar code scanner.

2. Background of the Invention

Bar codes are used in a wide variety of applications for retrieving information from objects, such as price. In this respect, bar code scanners are of widespread use in grocery stores and department stores, for both inventory control and for point-of-sales transactions.

A bar code normally includes several bar code characters. A bar code character is a group of lines (bars) and spacings that represent a single number or letter. A bar code symbol is a collection of several bar code characters which represent an identification of a particular object. The lines of the bar code can vary, for example, in a range from about 1/8" to 1" in height, and from about 1 to 50 mils in thickness. The spacings between the lines making up the bar code may be of various widths, with the variations in the spacing being one determination of the type of bar code characters making up the bar code.

Typically, bar codes are read by illuminating the bars and spacings in a sequential manner, with the bars absorbing light and the background spacings reflecting light. This results in a pattern of reflections and nonreflections that is sensed by a light detecting circuit resident in the bar code scanner. The light detecting circuit provides an input to a digital processor, which includes a decoder for interpreting the bar code so as to obtain a digital word.

The operation and components of a bar code scanner are described in "Hand Held Bar Code Scanning Device Having a Manually Operated Optical Trigger Switch", invented by R. Walts et al., assigned to PSC Inc., which is incorporated herein by reference.

The ability of a bar code scanner to read a bar code satisfactorily is dependent on its resolution. This resolution defines the ability of the bar code scanner to read the narrowest bar or space. Resolution is dependent on the size and sharpness of the spot of light that illuminates the bar code.

The ability of a bar code scanner to read a bar code satisfactorily is also dependent on the bar code symbol itself. That is, if there are imperfections within the bar code symbol, such as ink spreads causing the dark lines to be larger than they should be, or due to "white space" regions appearing within some or all of the dark lines, or due to dark regions within the white lines making up part of the bar code symbol, these imperfections could lead to an improper or unsuccessful decoding of the bar code symbol.

U.S. Pat. No. 3,890,597, invented by L. Hanchett, discloses logic circuitry for generating a signal when bar-coded information includes noise signals. The logic circuitry detects when a width of a bar is too narrow or too wide, or when a height of a bar is too small. The logic circuitry uses predetermined, known widths of bar codes in order to make this assessment.

U.S. Pat. No. 5,336,874, invented by K. Hasegawa, discloses a bar code reader that has an error detection capability that can determine whether a counted number of bars falls within a permissible range for a given bar code symbology.

U.S. Pat. No. 5,326,961, invented by Y. Sibata, discloses a bar code reader which determines whether a detected bar code is correct and which prevents a wrong recognition of a bar code.

U.S. Pat. No. 5,457,308, invented by G. Spitz et al., discloses a technique for combining or stitching partial scans in order to be able to properly decode a bar code symbol. The bar code is scanned and the fragments are decoded until a fragment with a start character and another with a stop character are found. The two fragments are combined to form the required ordered sequence of data characters.

U.S. Pat. No. 4,652,731, invented by J. Chautemps et al., discloses a process of detecting bar codes and to eliminate any flaws possibly present in the codes. The process uses detector rows positioned perpendicularly with respect to the bar code in order to determine and correct any flaws in the bar code.

None of the above-mentioned references are able to correct flaws in the bar code, nor are they able to update the correction process due to a change in a pointing direction of the scanner while the scanning function is operating.

It is thus desirable to be able to successfully scan and decode bar code symbols that have various imperfections, due to ink spread, foreign matter on the symbol, and the like, so that the imperfect bar code symbols will not have to be read via other means (i.e., entering the actual numbers written below the bar code symbol via a cash register keyboard input).

SUMMARY OF THE INVENTION

In view of this desire, it is an object of the invention to be able to successfully scan and decode bar code symbols that may contain various types of imperfections.

In accordance with this and other objects, there is provided a method of scanning a bar code symbol. The method includes a step of scanning a bar code symbol and obtaining a first signal return as a result thereof. The method also includes a step of attempting to decode the first signal return in order to obtain a decoded bar code symbol. The method further includes a step of determining a size of a minimum width bar and a minimum width white space within the bar code symbol based on the first signal return. The method still further includes a step of scanning the bar code symbol and obtaining a second signal return as a result thereof. The method also includes a step of altering the second signal return as an altered second signal return to eliminate bars in the second signal return that have a width less than or equal to the minimum width bar and to eliminate white spaces in the second signal return that have a width less than or equal to the minimum width white space. The method further includes a step of decoding the altered second signal return in order to obtain a decoded bar code symbol if the decoding of the first signal return was unsuccessful.

In accordance with the above-mentioned object and other objects, there is also provided an apparatus for scanning a bar code symbol. The apparatus is housed within a bar code scanner which receives signal returns of the bar code symbol via a light detector. The bar code scanner also has a trigger signal indicative of a desired scanning operation by an operator, and a start-of-scan signal indicative of an actual scanning operation being performed by the bar code scanner. The bar code scanner further has a decoder for decoding an input signal in order to obtain a digital representation of the bar code symbol. The apparatus includes a void and spot discrimination circuit connected to receive the signal returns of the bar code symbol and to output a void and spot discriminated signal to the decoder based on a number of scans as determined by the start-of-scan signal input to the void and spot discrimination circuit at a first input port. The void and spot discrimination circuit eliminates light spaces that are less than a first predetermined size and dark bars that are less than a second predetermined size in one of the signal returns corresponding to one of the scans. The first and second predetermined sizes are determined based on a minimum width space and a minimum width dark bar, respectively, determined from another of the signal returns corresponding to a previous one of the scans.

BRIEF DESCRIPTION OF THE DRAWINGS

These and other objects and advantages of the invention will become more fully apparent from the following detailed description when read in conjunction with the accompanying drawings, with like reference numerals indicating corresponding parts throughout, and wherein:

FIGS. 7a through 7g are timing diagrams of processed return signals at various blown-up locations of a return signal.

DETAILED DESCRIPTION OF THE PREFERRED EMBODIMENTS

When a bar code symbol is created, for example, on a package containing a product to be sold in a department store, the symbol may be unreadable or incorrectly read due to imperfections in the symbol. Print voids on black bars can cause an unsuccessful or incorrect scan of a bar code symbol, since these voids appear as drop outs on "negative target" impulse functions on a digitized waveform of a bar code symbol. Furthermore, dark spaces on white bars can also cause an unsuccessful or incorrect decoding of the bar code symbol. Therefore, it is important that a bar code symbol be printed with as few as possible imperfections.

However, printing processes are not perfect, and various imperfections may happen during the creation of a bar code symbol. The invention as described herein allows for reading of bar code symbols with imperfections, so as to be able to successfully scan, decode and read information of the bar code symbol.

Figure 1:
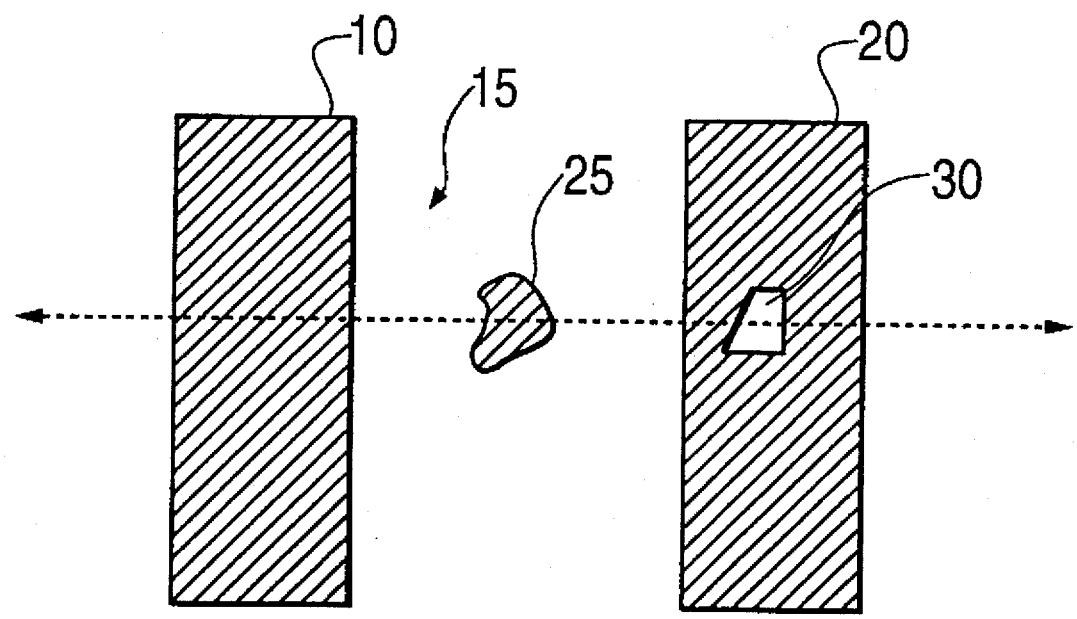
FIG. 1 is a diagram of a bar code symbol that has various kinds of imperfections.

FIG. 1 shows one example of part of an imperfect bar code symbol. The bar code symbol includes a first black bar 10, a second black bar 20, and a white space region 15 between the first and second black bars 10, 20. A small black region 25 is located within the white space region 15, and it is in the bar code symbol due to imperfect printing of the bar code symbol (or perhaps due to a foreign, dark-colored substance on the bar code symbol). In the second black bar 20, there is a print void, which corresponds to a white space region 30 within the second black bar 20. The print void 30 is in the bar code symbol due to imperfect printing of the bar code symbol (or perhaps due to a foreign, light-colored substance on the bar code symbol).

When the bar code symbol is scanned by a conventional bar code scanner across the region indicated by the dashed arrows in FIG. 1, it may be the case that the print void 30 in the second black bar 20 causes the detection and decoding circuitry of the conventional bar code scanner to incorrectly determine that the second black bar 20 is instead two black bars with a white space in between them.

Similarly, when the small black region 25 within the white space region 15 is scanned across by the conventional bar code scanner, the detection and decoding circuitry of the conventional bar code scanner may incorrectly determine that the white space region 15 is instead two white space regions separated by a black bar.

In order to be able to successfully scan a bar code symbol which has imperfections, such as the bar code symbol shown in FIG. 1, the method and apparatus of the invention has been developed.

Figure 2:
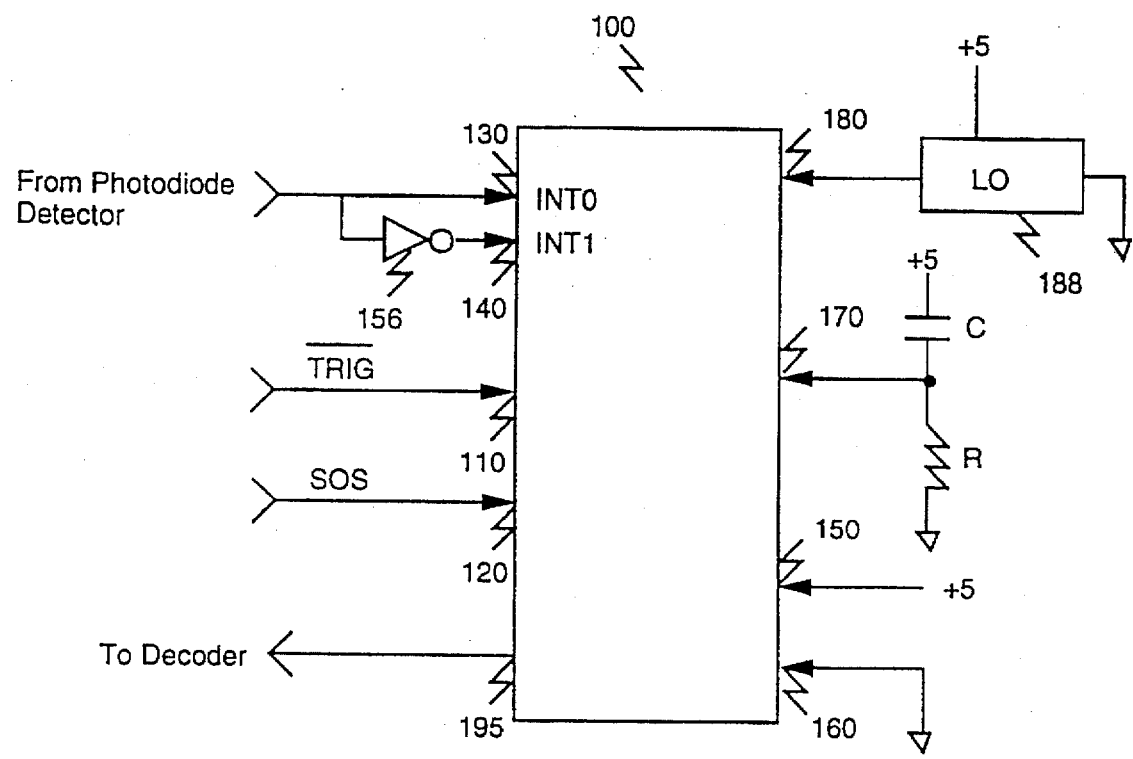
FIG. 2 is a diagram of the void and spot discrimination circuit according to an embodiment of the invention.

The void and spot discrimination circuit 100 of the system according to the invention is shown in FIG. 2. In the preferred embodiment, the void and spot discrimination circuit 100 is implemented as a microcontroller, for example, an 83C750 device. The void and spot discrimination circuit 100 can alternatively be implemented as a programmable logic device, or similar type of device as is known to one of ordinary skill in the art.

The void and spot discrimination circuit 100 has a first input port 110 for receiving a trigger signal TRIG_. In the preferred embodiment, the trigger signal TRIG_ is an active low signal, but the void and spot discrimination circuit 100 could work equally as well with the trigger signal being an active high signal. The trigger signal TRIG_ is activated when an operator operates the bar code scanner so as to scan a bar code symbol. When the operator releases the trigger on the bar code scanner, the trigger signal TRIG_ is inactive high, and when the operator holds the trigger, the trigger signal TRIG_ is active low.

The void and spot discrimination circuit 100 has a second input 120 for receiving a start-of-scan signal SOS. The start-of-scan signal is in an idle state (i.e., either a high state or a low state) when the bar code scanner is not scanning, and it is in an active, toggling state when the bar code scanner is scanning. The start-of-scan signal SOS is used to inform the void and spot discrimination circuit 100 when a scan process is being performed by the bar code scanner. As mentioned above, the start-of-scan signal SOS appears as a pulse train when the bar code scanner is scanning, with each pulse in the pulse train corresponding to one left-to-right or right-to-left scan. Note that the bar code scanner used in the preferred embodiment alternates its scans between a left-to-right scan and a right-to-left scan, but this need not necessary be the case (i.e., other types of scans, such as one-way-only scans, can be used with the void and spot discrimination processing).

Figure 3:
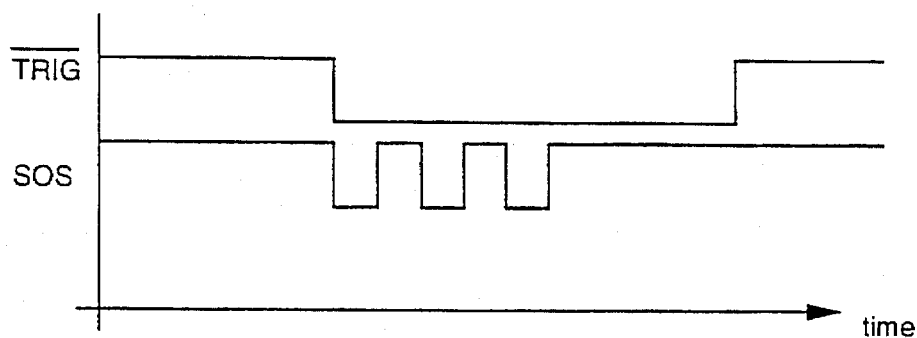
FIG. 3 is a timing diagram of various input signals to the void and spot discrimination circuit.

When the operator holds the trigger, both the start-of-scan signal SOS and the trigger signal TRIG_ will be active. That is, the SOS signal will be toggling between a high and a low state, and the TRIG_ signal will be in a low state. However, during the time that the operator holds down the trigger, if a decoder within the bar code scanner is able to successfully decode a scanned bar code symbol, then it will deactivate the start-of-scan signal SOS (i.e., SOS signal goes to an idle state, either high or low), while in the meantime the trigger signal TRIG_ is still active low. FIG. 3 shows the start-ofscan signal SOS and the trigger signal TRIG_ in various states. As soon as the trigger is deactivated by the operator, both the start-of-scan signal SOS and the trigger signal TRIG_ are placed into their respective inactive states.

The void and spot discrimination circuit 100 has a first interrupt input port 130 for receiving a signal indicative of a high-to-low transition of a signal return from a scanned bar code. This signal return may be input directly from a photodiode detector (not shown) which is configured to receive light reflected off of a bar code symbol due to light incident on the bar code symbol from a laser diode (not shown) resident within the bar code scanner. Alternatively, the first interrupt input may receive a processed signal, for example, a differentiated signal return, in which the output of the photodiode detector is input to a differentiator circuit (not shown) in order to accentuate the low-to-high and high-to-low transitions (that is, the edges of the black bars and white spaces) of the return light from the scanned bar code symbol. In still another possibility, the signal return from the scanned bar code symbol may be digitized prior to it being input to the first interrupt input 130.

Figure 4:
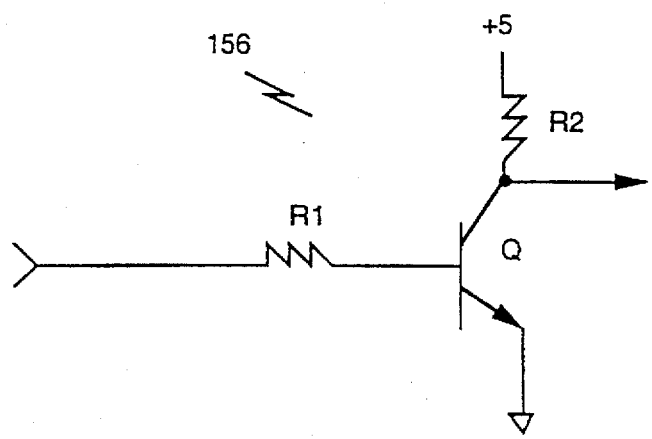
FIG. 4 is a diagram of an inverter that can be used with the void and spot discrimination circuit.

The void discrimination circuit 100 also has a second interrupt input port 140 for receiving a signal indicative of a low-to-high transition of a signal return from a scanned bar code, in a manner similar to that described with respect to the input to the first interrupt input port 130. Based on the inputs to the first and second interrupt input ports 130, 140, the void and spot discrimination circuit 100 is able to determine widths of black bars and white spaces of the scanned bar code symbol based on the return light that is picked up by the photodiode detector and sent to the void and spot discrimination circuit 100. An inverter 156 is shown in FIG. 2, which inverts the return signal received from the scanned bar code symbol so as to create a low-to-high transition at the first interrupt input port 130 and a high-to-low transition at the second interrupt input port 140. One implementation of the inverter 156 is shown in FIG. 4, which corresponds to a bipolar junction transistor Q and a pair of resistors R1, R2.

The void and spot discrimination circuit 100 also receives a high reference voltage (shown as +5 volts) on another input port 150, a low reference voltage (shown as ground) on still another input port 160, and an RC combination coupled between a high reference voltage (+5 volts) and a low reference voltage (ground) on yet another input port 170. Based on these inputs, as well as a stable frequency signal received on another input port 180 from a stable local oscillator 188, the void and spot discrimination circuit 100 is able to successfully scan many types of imperfect bar code symbols. In the preferred embodiment, the stable local oscillator 188 outputs a stable frequency signal, for example, 33 MHz. The void and spot discrimination circuit 100 outputs data on an output port 195 as a bar code signal OUT. The bar code signal OUT is used by a decoder (not shown) so as to decode the bar code symbol in order to obtain a digital data stream indicative of information stored within the bar code symbol.

The method of performing void and spot discrimination using the void and spot discrimination circuit 100 of the invention will now be described in detail.

For a first and a second scan of a bar code symbol, the method determines the smallest width black bar and the largest width black bar, as a minimum and a maximum value, respectively, to be used later in the process. The values are determined based on the inputs to the first and second interrupt ports 130, 140 to the void and spot discrimination circuit 100. Also, a minimum and a maximum value are determined for white spaces within the scanned bar code symbol. The first and second scans correspond respectively to a left-to-right scan followed by a right-to-left scan across the bar code symbol, or vice-versa. After the first and second scans have been completed, a minimum and a maximum value for the black bars and the white spaces are determined, to be used for void and spot discrimination processing for the subsequent third and fourth scans.

The first and second scans do not utilize any void and spot discrimination processing whatsoever, but rather are used to collect data to be used for later scans that do utilize void and spot discrimination processing. Thus, the return signal that is received by the void and spot discrimination circuit 100 via the first and second interrupt ports 130, 140 is sent directly to a decoder without any manipulation of that data being performed by the void and spot discrimination circuit 100. Note that if the scanned bar code symbol has very minor (or no) imperfections, the decoding of the non-processed data received during the first and second scans will most likely result in a successful decoding by the decoder.

The processing required by the decoder takes a finite amount of time due to the signal processing involved. Thus, the decoder may not be able to make a successful/nonsuccessful decoding determination based on the first and second scans until some time later, say, for example, during the fifth scan.

Figure 5A:
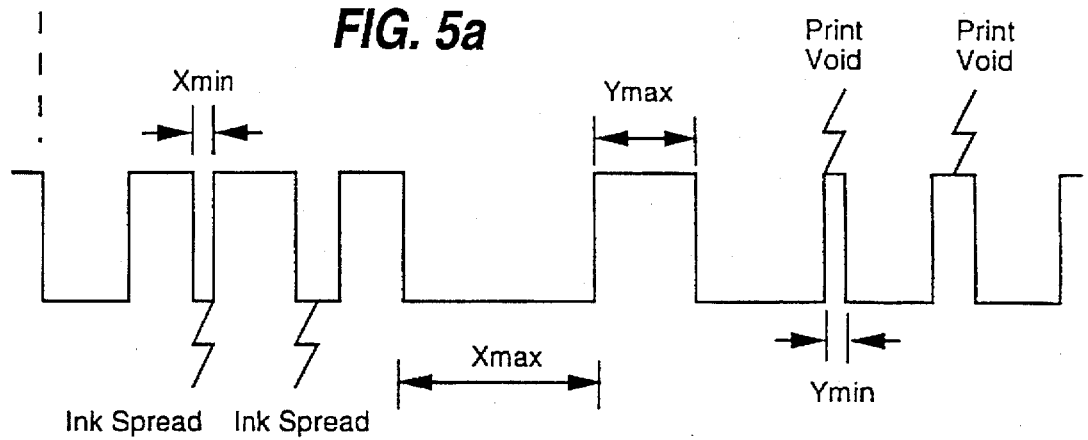
FIGS. 5a and 5b are timing diagrams of return signals from non-processed first/second scans and processed third/fourth scans, respectively.

For the third and fourth scans (performed in opposite directions across the bar code symbol), the minimum and maximum values obtained for the black bars and the white spaces from the first and second scans are used to perform void and spot discrimination processing of the return data received from the scanned bar code symbol at the first and second interrupt ports 130, 140. Referring now to FIG. 5a, assume that the output of the first and second scans results in the return signal pattern as shown. A smallest width black bar is determined as the bar 260, and a smallest width white space is determined as the white space 250. Also, a largest width black bar is determined as the bar 280, and a largest width white space is determined as the white space 270. Note that a "high" level for the return signal from the scanned bar code corresponds to scanning of a light-colored area (i.e., white space) within the bar code symbol, and a "low" level corresponds to scanning of a dark-colored area (i.e., black bar) within the bar code symbol.

Alternatively, the signal return may be an inverse signal return, in which a "negative" of a bar code is received. In this case, a "low" signal return level corresponds to an eventual white space region, and a "high" signal return level corresponds to an eventual black bar region. U.S. Pat. No. 5,420,410, entitled "Bar Code Signal Digitizer Adapted for Signals from Inverse Bar Codes", invented by E. Bremer, and assigned to PSC Inc., which is incorporated herein by reference, discloses a bar code scanner that can scan such inverse images. The void and spot discrimination circuit 100 can work equally as well with such a device.

Based on a width Xmin of the smallest black bar 260 and a width Ymin of the smallest white space 250, as determined during the first and second scans, all black bars in the third and fourth scans that have a width less than or equal to Xmin are made white, and all white spaces in the third and fourth scans that have a width less than or equal to Ymin are made black.

Figure 5B:
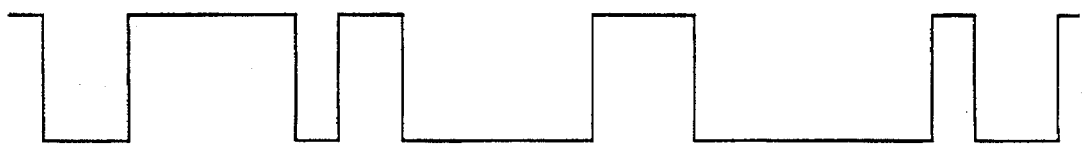

FIG. 5b shows the return signal from the scanned bar code symbol after the void and spot discrimination process is performed, in which the minimum/maximum size inputs of the first and second scans are used for processing the bar code inputs of the third and fourth scans. Note that FIGS. 5a and 5b show that the return data is essentially the same between scans one and two and scans three and four, which may not necessarily always be the case (i.e., bar code scanner may be pointed to a different location between second and third scans, or light intensity may change in an area where scanning takes place). A width Xmax of the largest black bar 280 and a width Ymax of the largest white space 270 are used as values for determining whether the void and spot discrimination process is to be stopped. The stopping process will be described more fully at a later section.

The void and spot discrimination processed data from the third and fourth scans is sent to a decoder (not shown), which processes the data in order to determine if it corresponds to a bar code that can be successfully decoded into a digital bit stream. If so, then the process stops, and if not, the process continues. Note that if the decoder is able to successfully decode the bar code based on the non-processed data obtained during the first and second scans, then the void and spot discrimination process stops (which might occur somewhere during the third and fourth scans) via deactivation of the start-of-scan signal SOS (i.e., SOS signal being in a constant, non-toggle state) that is sent to the void and spot discrimination circuit 100 by the decoder.

If a successful decoding has not as yet been made by the decoder, then fifth and sixth (opposite direction) scans are made across the bar code symbol. The fifth and sixth scans are performed without any void and spot discrimination processing being performed, and are thus like the first and second scans in this manner. Similarly, a minimum width XXmin, YYmin for black bars and white spaces, respectively, is obtained via the return data from the fifth and sixth scans (see FIG. 6a). Also, a maximum width XXmax, YYmax for black bars and white spaces, respectively, is obtained via the return data from fifth and sixth scans (see FIG. 6a). These values are used during the void and spot discrimination processing performed on the data received during the seventh and eighth scans.

If the decoder has still not output a successful decoding signal (via deactivation of the SOS signal) to the void and spot discrimination circuit 100, the seventh and eighth scans are made across the bar code symbol. The seventh and eighth scans are similar to the third and fourth scans in that the minimum/maximum information obtained during the fifth and sixth scans are used to fill in voids and eliminate ink spreads. The only difference between the processing done for the seventh and eighth scans with respect to the processing done with respect to the third and fourth scans is that an offset is added to the minimum values XXmin, YYmin, so as to create a larger size void filling/ink spread eliminating function for the void and spot discrimination processing of return data from the scanned bar code symbol during the seventh and eighth scans.

In the preferred embodiment, a size corresponding to one clock pulse (i.e., a 1 microsecond pulsewidth) is used to increase the size of the minimum values used in void and spot discrimination for the seventh and eighth scans from XXmin, YYmin to XXmin+$\Delta$ and YYmin+$\Delta$, respectively, where $\Delta$=1 microsecond.

Figure 6A:
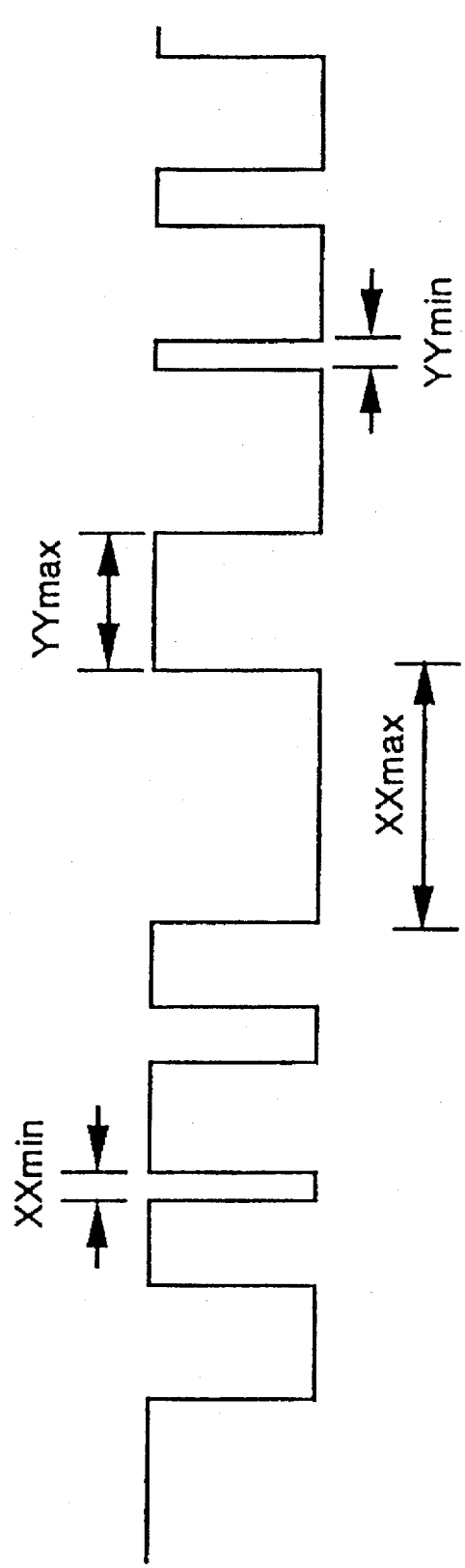
FIGS. 6a and 6b are timing diagrams of return signals from non-processed fifth/sixth scans and processed third/fourth scans, respectively.
Figure 6B:
Figure 7D:
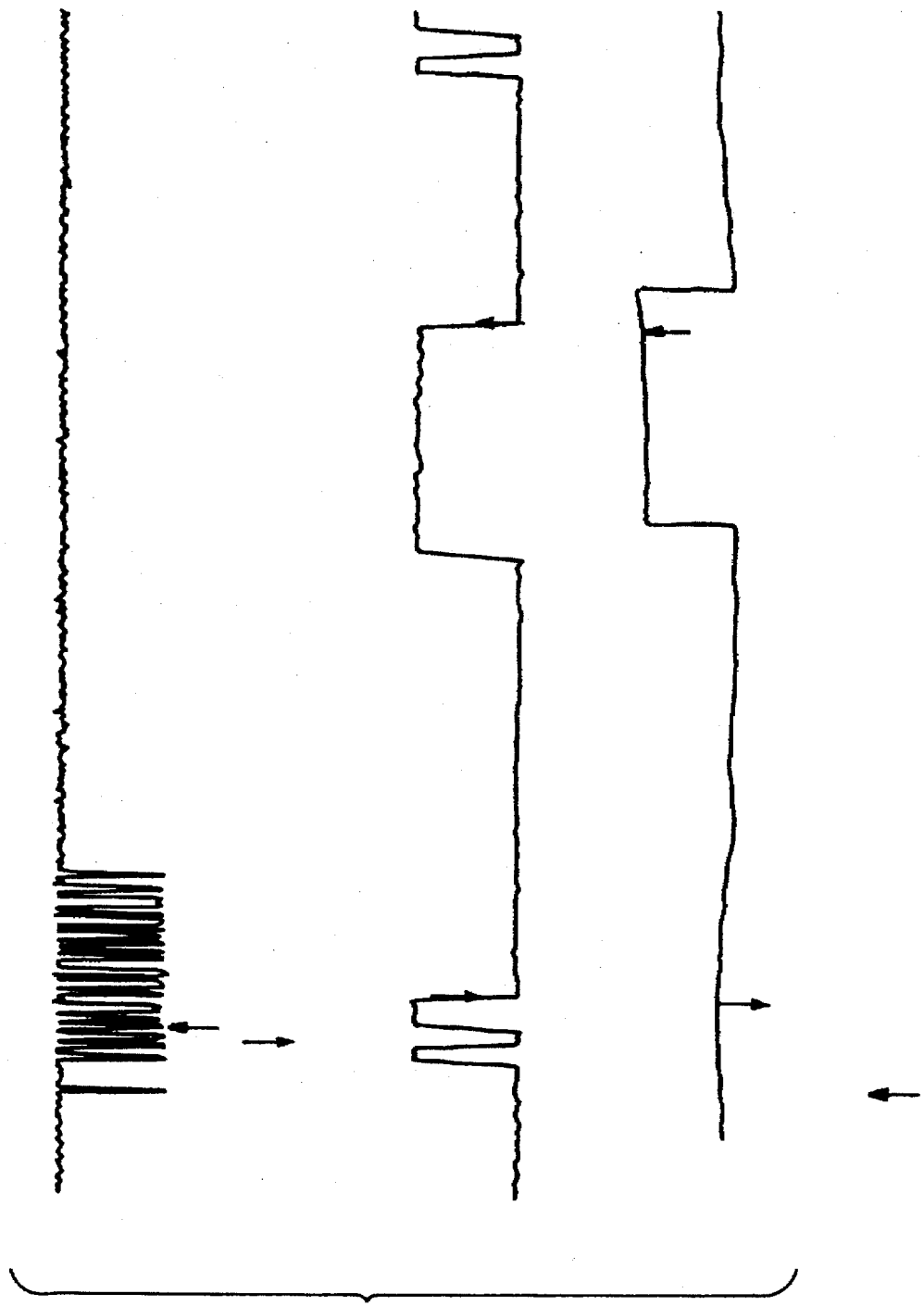
Figure 7G:
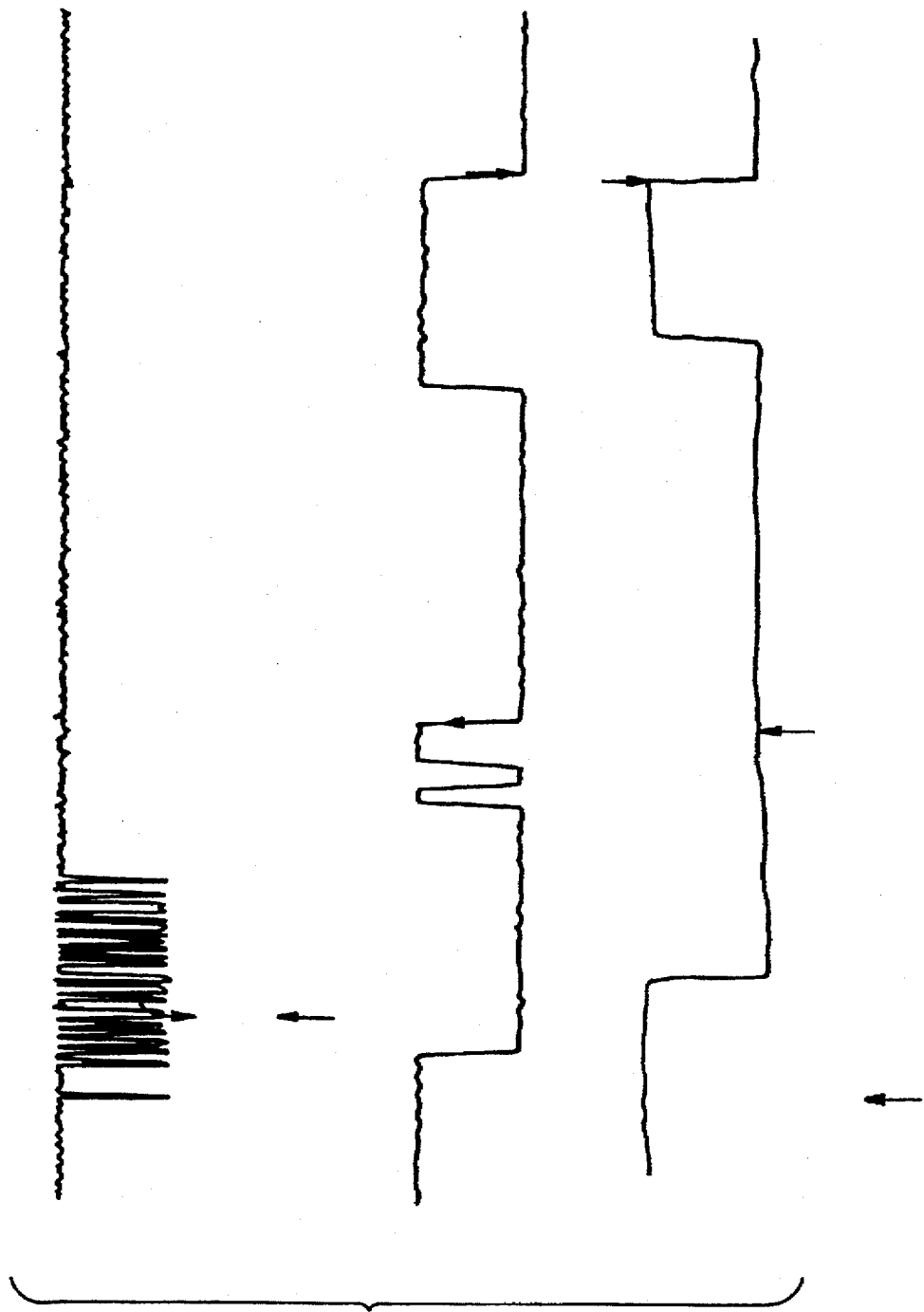

FIGS. 6a and 6b show the non-void processed and non-spot processed return signal from the fifth/sixth scans and the void and spot discriminated return signal from seventh/eighth scans, respectively. Referring now to FIG. 6b, all print voids having a size equal to or less than YYmin+$\Delta$ and all ink spreads having a size equal to or less than XXmin+$\Delta$ are eliminated by the void and spot discriminating processing of the seventh and eighth scans. Note that a comparison is made between the value XXmin+$\Delta$ to XXmax, and a comparison is made between the value YYmin+$\Delta$ to YYmax, where XXmax and YYmax respectively correspond to the maximum size black bar and the maximum size white space determined from the return data received during the fifth and sixth scans, in which void and spot discrimination processing was not performed on that data. If either XXmin+$\Delta$>XXmax, or if YYmin+$\Delta$>YYmax, the void and spot discrimination processing stops due to a non-successful scan being determined. If this determination is made, the void and spot discrimination process returns back to a starting point (i.e., the first and second scans) to retry to successfully scan and decode the bar code symbol.

If the comparisons with XXmax and YYmax do not result in a stopping of the void and spot discrimination processing, the process continues in a manner similar to that described for the first through eight scans. The ninth and tenth scans are performed similarly to the first and second scans and the fifth and sixth scans, in which no void and no spot discrimination is performed, with return data from these scans being used to determine a minimum size for the black bars and white spaces XXXmin, YYYmin, as well as a maximum size for the black bars and white spaces XXXmax, YYYmax, scanned during the ninth and tenth scans.

Of course, as mentioned earlier, if the decoder determines that a successful bar code scan has been made based on the data input thereto, it outputs a signal to stop the void and spot discriminating processing. For example, if the decoder determines during the ninth and tenth scans that a successful bar code decoding has been made due to the void and spot discriminated data obtained from the seventh scan, a signal is sent to the void and spot discrimination circuit 100 to cease any further scans, and so scanning stops somewhere during the ninth and tenth scans.

If, however, a successful bar code decoding has not been made as yet, the ninth and tenth scans proceed, followed by eleventh and twelfth scans, in which the minimum/maximum information obtained from the ninth and tenth scans is used to perform void and spot discrimination processing for the data obtained from the eleventh and twelfth scans.

As mentioned earlier, the processing of return data from the eleventh and twelfth scans is similar to the processing of return data from the third and fourth scans and the processing of return data from the seventh and eighth scans, in that the minimum/maximum information obtained during the previous two opposite-direction scans are used to fill in voids and eliminate ink spreads. The only difference between the processing done for the eleventh and twelfth scans with respect to the processing done with respect to the seventh and eighth scans is that a different offset is added to the minimum values XXXmin, YYYmin, so as to create a potentially larger size void filling/ink spread eliminating function for the void and spot discrimination processing of return data received during the eleventh and twelfth scans.

In the preferred embodiment, a size corresponding to two clock pulses (i.e., a 2 microsecond pulsewidth size) is used to increase the size of the minimum values used in void and spot discrimination for the eleventh and twelfth scans to XXXmin+2*$\Delta$ and YYYmin+2*$\Delta$, respectively, where $\Delta$ corresponds to a size of one clock pulse.

All print voids having a size equal to or less than YYYmin+2*$\Delta$ and all ink spreads having a size equal to or less than XXXmin+2*Δ are eliminated by the void and spot discriminating processing of the eleventh and twelfth scans. Note that a comparison is made between the value XXXmin+2*Δ to XXXmax, and a comparison is made between the value YYYmin+2*Δ to YYYmax, where XXXmax and YYYmax respectively correspond to the maximum size black bar and the maximum size white space determined from the non-processing performed during the ninth and tenth scans. If either XXXmin+2*Δ>XXXmax, or if YYYmin+2*Δ>YYYmax, the void and spot discrimination processing stops due to a non-successful scan being determined as this time. If this determination is made, the void and spot discrimination process returns back to a starting point (i.e., the first and second scans) to retry to successfully scan and decode the bar code symbol.

If the comparisons with XXXmax and YYYmax do not result in a stopping of the void and spot discrimination processing, the process continues in a manner similar to that described for the first through twelfth scans.

The alternating use of void and spot discrimination processing and non-void and non-spot discrimination processing for respective successive pairs of scans ensures a greater ability to successfully decode a bar code symbol with various types of imperfections within the symbol. For each pair of successive scans in which void and spot discrimination processing is performed, the offset added to the minimum width values obtained from the previous two non-void and non-spot discrimination processed scans is increased.

For example, for the fifteenth and sixteen scans in the void and spot discrimination process according to the preferred embodiment, an offset of 4*Δ is added to the minimum black bar and white space widths obtained during the non-void and non-spot discrimination processing of the thirteenth and fourteenth scans. The offset value can be increased by one clock period for each pair of scans, or it can be increased by any other value (for example, increase offset by $2^n$, where n=number of scan pair scanned so far), as is known to one of ordinary skill in the art while keeping within the teachings of the invention as described herein. The offset function is implemented in software resident in the void and spot discrimination circuit 100 by using the TRIG_ and SOS signals as inputs to determine a particular scan number during the void and spot discrimination process.

Of course, once the offset is large enough such that the minimum width of a black bar or a white space added to the offset is greater than or equal to the maximum width of a black bar or a white space, respectively, the void and spot discrimination processing stops due to the inability of the void and spot discrimination process to correctly alter input data so as to be successfully decoded by a decoder. If this happens, the void and spot discrimination process can proceed back to the start (i.e., first and second scans).

The alternating void and spot discrimination processing and non-void and non-spot discrimination processing for successive pairs of scans is especially useful for situations in which an operator points the scanner at a different location during the scanning process (i.e., while the trigger button is still held down by the operator). By always updating the minimum and maximum widths based on the previous two scans, the void and spot discrimination process ensures that the most useful minimum/maximum values for erasing ink spreads (i.e., inadvertent black regions) and for filling in white spaces (i.e., imperfect printing of black bars) is obtained.

FIGS. 7a through 7g show different blow ups of the void and spot discriminated return signal at different points of the return signal shown at the top timing diagram of each of these figures. The arrow at the top timing diagram indicates where in the return signal the blown-up bottom two timing diagrams are at. The middle timing diagram for each of the FIGS. 7a through 7g corresponds to the return data (i.e., received from a photodiode detector or from a digitizer coupled to the photodiode detector) that has not been processed using the void and spot discrimination circuit or method as described earlier. The bottom timing diagram for each of the FIGS. 7a through 7g corresponds to the void and spot discriminated return data. Note that there is a delay between the middle and bottom timing diagrams, due to the processing time required by the void and spot discrimination apparatus and method.

Referring now back to FIG. 2, based on the number of scans as determined by counting pulses of the start-of-scan signal SOS input via input port 120, the void and spot discrimination circuit 100 is configured to provide either void and spot discrimination processing, as it does for data received during the third and fourth scans and for data received during the seventh and eighth scans, for example. The void and spot discrimination circuit 100 is also configured to pass through the return data directly to the decoder without performing any void and spot discrimination processing, as it does for data received during the first and second scans and for data received during the fifth and sixth scans, for example. One of ordinary skill in the art will recognize that the void and spot discrimination processing performed by the void and spot discrimination circuit 100 may be performed entirely by software (via application programs resident within the void and spot discrimination circuit 100), or it may be performed via a combination of software and hardware.

For each scan, the process first looks for a "quiet zone", which corresponds to a white space of a predetermined size before a black bar is found. A quiet zone must exist for every properly constructed bar code symbol. Once a quiet zone is found, a minimum width and a maximum width black bar and white space for a scan can then be determined for those scans in which void and spot discrimination processing is not performed (i.e., the first and second scans). However, this determination cannot be made until a quiet zone is first detected, since all return data received prior to the detection of the quiet zone cannot be a real bar code symbol. The quiet zone is an indication of a start of a possible bar code symbol (although it may not always be the case that a detected quiet zone is actually a real bar code symbol). The scans in which void and spot discrimination processing is performed (i.e., the third and fourth scans) also need to determine a quiet zone in order to determine a starting point of the return data that is to be used in the void and spot discrimination processing.

While embodiments have been described herein, modification of the described embodiments may become apparent to those of ordinary skill in the art, following the teachings of the invention, without departing from the scope of the invention as set forth in the appended claims. For example, instead of relying on the comparison of the minimum widths, plus any offsets, to the maximum widths, in order to determine whether to stop the void and spot discrimination processing or not, a timer could instead be used based on a particular scan rate so as to stop the void and spot discrimination processing when no successful decoding occurs after, say, 20 scans.

Furthermore, the void and spot discrimination process described hereinabove can be utilized for other types of processes for examining and reading printed material, in which foreign objects on the printed material and/or imperfect printing of the printed material may lead to difficult recognition of the printed matter. By using a void and spot discrimination circuit or method as described above, however, the printed matter may be read correctly even with imperfections within the printed matter.

For example, given a character set representing letters and numbers of a predetermined or variable size, the void and spot discrimination circuit or method can be utilized to eliminate void and ink spreads so as to be able to successfully decode the character set.

What is claimed is:

1. A method of scanning a bar code symbol, comprising the steps of:
    a) scanning a bar code symbol and obtaining a first signal return as a result thereof;
    b) attempting to decode the first signal return in order to obtain a decoded bar code symbol;
    c) determining a size of a minimum width bar within the bar code symbol based on the first signal return;
    d) scanning the bar code symbol and obtaining a second signal return as a result thereof;
    e) altering the second signal return as an altered second signal return to eliminate bars in the second signal return that have a width less than or equal to the minimum width bar; and
    f) attempting to decode the altered second signal return in order to obtain a decoded bar code symbol if the decoding attempt of the first signal return was unsuccessful.

2. The method as recited in claim 1, wherein a first pair of opposite-direction scans are used to obtain the first signal return, and
    wherein a second pair of opposite-direction scans are used to obtain the second signal return.

3. The method as recited in claim 1, wherein each of the bars corresponds to a dark-colored region between two adjacent white-colored regions.

4. The method as recited in claim 1, wherein each of the bars corresponds to a white-colored region between two adjacent dark-colored regions.

5. The method as recited in claim 1, further comprising the steps of:
    c1) prior to the step d), determining a size of a maximum width bar within the bar code symbol based on the first signal return; and
    e1) only performing the altering step e) if the size of the minimum width bar is less a sum of the size of the maximum width bar and an offset size.

6. The method as recited in claim 5, wherein the steps a), b), c), c1), d), e), e1) and f) are repeatedly performed for a plurality of scans, and
    wherein the offset size increases for each successive scan of the plurality of scans.

7. An apparatus for scanning a bar code symbol, the apparatus being housed within a bar code scanner which receives signal returns of the bar code symbol via a light detector, the bar code scanner also having a trigger signal indicative of a desired scanning operation by an operator, and a start-of-scan signal indicative of an actual scanning operation being performed by the bar code scanner, the bar code scanner further having a decoder for decoding an input signal in order to obtain a digital representation of the bar code symbol, the apparatus comprising:
    a void and spot discrimination circuit connected to receive the signal returns of the bar code symbol and to output a discriminated signal to the decoder based on a number of scans as determined by the start-of-scan signal input to the void and spot discrimination circuit at a first input port,
    wherein the void and spot discrimination circuit eliminates bars that are less than a predetermined size in one of the signal returns corresponding to one of the scans, and
    wherein the predetermined size is determined based on a minimum width bar determined from another of the signal returns corresponding to a previous one of the scans.

8. The apparatus as recited in claim 7, further comprising:
    a clock divider circuit configured to receive a clock signal and to output a divided clock signal based on the number of scans, wherein the divided clock signal is input to the void and spot discrimination circuit, and
    wherein the predetermined size corresponds to a pulse-width of the divided clock signal.

9. The apparatus as recited in claim 8, wherein the void and spot discrimination circuit further comprises:
    a first interrupt input for receiving high-to-low transitions of the signal returns;
    a second interrupt input for receiving low-to-high transitions of the signal returns,
    wherein a minimum time difference between one of the high-to-low transitions and a next-occurring one of the low-to-high transitions results in the determination of the predetermined size.

10. The apparatus as recited in claim 9, wherein if the decoder outputs a successful decoding signal to the void and spot discrimination circuit based on data input to the decoder by the void and spot discrimination circuit, the void and spot discrimination circuit stops any further processing of signal returns from current scans of the bar code symbol.

11. The apparatus as recited in claim 10, wherein the void and spot discrimination circuit determines a maximum time between any two successive high-to-low transitions in order to determine a second predetermined size,
    wherein if the predetermined size is equal to or greater than the second predetermined size, the void and spot discrimination circuit stops any further processing of signal returns from the current scans of the bar code symbol, and
    wherein the clock divider circuit is reset so as to output the divided clock signal based on a current scan being a first scan.

12. The apparatus as recited in claim 7, wherein each of the bars corresponds to a dark-colored region between two adjacent white-colored regions.

13. The apparatus as recited in claim 7, wherein each of the bars corresponds to a white-colored region between two adjacent dark-colored regions.

14. A method of recognizing a set of characters having dark-colored regions and light-colored regions, the method comprising the steps of:
    a) scanning the set of characters and obtaining a first signal return as a result thereof;
    b) attempting to decode the first signal return in order to obtain a decoded set of characters;
    c) determining a size of a minimum width region within the character set based on the first signal return, the minimum width region being one of the light-colored regions and the dark-colored regions;
    d) scanning the set of characters and obtaining a second signal return as a result thereof;

e) altering the second signal return as an altered second signal return to eliminate regions in the second signal return that have a same color as the minimum width region and that have a width less than or equal to the minimum width region; and f) attempting to decode the altered second signal return in order to obtain the decoded set of characters if the decoding attempt of the first signal return was unsuccessful.

15. The method as recited in claim 14, wherein a first pair of opposite-direction scans are used to obtain the first signal return, and wherein a second pair of opposite-direction scans are used to obtain the second signal return.

16. The method as recited in claim 14, further comprising the steps of:

c1) prior to the step d), determining a size of a maximum width region within the set of characters based on the first signal return, the maximum width region having a same color as the minimum width region; and e1) only performing the altering step e) if the size of the minimum width minimum is less a sum of the size of the maximum width region and an offset size.

17. The method as recited in claim 16, wherein the steps a), b), c), c1), d), e), e1) and f) are repeatedly performed for a plurality of scans, and wherein the offset size increases for each successive scan of the plurality of scans.

18. An apparatus for scanning a set of characters, the set of characters having light-colored regions and dark-colored regions, the apparatus being housed within a scanner which receives signal returns of the set of characters via a light detector, the scanner also having a trigger signal indicative of a desired scanning operation by an operator, and a start-of-scan signal indicative of an actual scanning operation being performed by the scanner, the scanner further having a decoder for decoding an input signal in order to obtain a digital representation of the set of characters, the apparatus comprising:

a void and spot discrimination circuit connected to receive the signal returns of the set of characters and to output a discriminated signal to the decoder based on a number of scans as determined by the start-of-scan signal input to the void and spot discrimination circuit at a first input port, wherein the void and spot discrimination circuit eliminates all of the light-colored regions and dark-colored regions that are less than a predetermined size in one of the signal returns corresponding to one of the scans, and wherein the predetermined size is determined based on a minimum width of one of the dark-colored regions and light-colored regions determined from another of the signal returns corresponding to a previous one of the scans.

19. The apparatus as recited in claim 18, further comprising:

a clock divider circuit configured to receive a clock signal and to output a divided clock signal based on the number of scans, wherein the divided clock signal is input to the void and spot discrimination circuit, and wherein the predetermined size corresponds to a pulse-width of the divided clock signal.

20. The apparatus as recited in claim 19, wherein the void and spot discrimination circuit further comprises:

a first interrupt input for receiving high-to-low transitions of the signal returns;

a second interrupt input for receiving low-to-high transitions of the signal returns, wherein a minimum time difference between one of the high-to-low transitions and a next-occurring one of the low-to-high transitions results in the determination of the predetermined size.

21. The apparatus as recited in claim 20, wherein if the decoder outputs a successful decoding signal to the void and spot discrimination circuit based on data input to the decoder by the void and spot discrimination circuit, the void and spot discrimination circuit stops any further processing of signal returns from current scans of the set of characters.

22. The apparatus as recited in claim 21, wherein the void and spot discrimination circuit determines a maximum time between any two successive high-to-low transitions in order to determine a second predetermined size, wherein if the predetermined size is equal to or greater than the second predetermined size, the void and spot discrimination circuit stops any further processing of signal returns from the current scans of the set of characters, and wherein the clock divider circuit is reset so as to output the divided clock signal based on a current scan being a first scan.

* * * * *